United States Patent
Holzmueller et al.

(10) Patent No.: US 10,262,768 B2
(45) Date of Patent: Apr. 16, 2019

(54) POWER CABLE FOR CABLE DEPLOYED ELECTRIC SUBMERSIBLE PUMPING SYSTEM

(71) Applicant: SCHLUMBERGER TECHNOLOGY CORPORATION, Sugar Land, TX (US)

(72) Inventors: Jason Holzmueller, Lawrence, KS (US); William Goertzen, Lawrence, KS (US); Gregory Howard Manke, Overland Park, KS (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/532,800

(22) PCT Filed: Nov. 30, 2015

(86) PCT No.: PCT/US2015/062883
§ 371 (c)(1),
(2) Date: Jun. 2, 2017

(87) PCT Pub. No.: WO2016/089717
PCT Pub. Date: Jun. 9, 2016

(65) Prior Publication Data
US 2017/0365375 A1    Dec. 21, 2017

Related U.S. Application Data

(60) Provisional application No. 62/086,565, filed on Dec. 2, 2014.

(51) Int. Cl.
*H01B 7/00*  (2006.01)
*H01B 7/04*  (2006.01)
(Continued)

(52) U.S. Cl.
CPC .......... *H01B 7/046* (2013.01); *E21B 17/206* (2013.01); *H01B 1/026* (2013.01); *H01B 3/427* (2013.01);
(Continued)

(58) Field of Classification Search
CPC ...... H01B 7/046; H01B 17/206; H01B 1/026; H01B 3/427; H01B 7/02; H01B 7/24; H01B 7/282
(Continued)

(56) References Cited

U.S. PATENT DOCUMENTS 4,130,450 A * 12/1978 Bander ................. H01B 7/282
156/48
4,284,841 A * 8/1981 Tijunelis ................ H01B 7/046
174/102 R
(Continued)

OTHER PUBLICATIONS

International Search Report and Written Opinion for corresponding PCT Application Serial No. PCT/US2015/062883, dated Mar. 8, 2016, 13 pages.
(Continued)

*Primary Examiner* — William H Mayo, III

(57) ABSTRACT

A technique facilitates construction and operation of a power cable which may be used to deploy an electric submersible pumping system downhole into a wellbore. The power cable is constructed to provide structural support of the electric submersible pumping system while also providing electric power to the electric submersible pumping system when located downhole in the wellbore. The power cable has at least one conductor and a plurality of layers selected and arranged to ensure long-term support and delivery of electrical power in the relatively harsh downhole environment.

20 Claims, 2 Drawing Sheets

(51) Int. Cl.
*E21B 17/20* (2006.01)
*H01B 1/02* (2006.01)
*H01B 3/42* (2006.01)
*H01B 7/02* (2006.01)
*H01B 7/24* (2006.01)
*H01B 7/282* (2006.01)
*H01B 13/24* (2006.01)
*E21B 43/12* (2006.01)

(52) U.S. Cl.
CPC ................. *H01B 7/02* (2013.01); *H01B 7/24* (2013.01); *H01B 7/282* (2013.01); *H01B 13/24* (2013.01); *E21B 43/128* (2013.01)

(58) Field of Classification Search
USPC ........ 174/102 R, 103, 105, 106, 108, 110 R, 174/113 R
See application file for complete search history.

(56) References Cited

U.S. PATENT DOCUMENTS

| | | | |
|---|---|---|---|
| 4,449,013 A | 5/1984 | Garshick | |
| 4,472,597 A * | 9/1984 | Uematsu | H01B 7/2825 |
| | | | 174/106 SC |
| 4,600,805 A | 7/1986 | Glynn et al. | |
| 4,703,134 A * | 10/1987 | Uematsu | H01B 7/2825 |
| | | | 174/106 SC |
| 6,127,632 A * | 10/2000 | Oswald | H01B 7/046 |
| | | | 174/120 R |
| 2002/0104675 A1 | 8/2002 | McLeod | |
| 2010/0186990 A1* | 7/2010 | Neuroth | H01B 7/045 |
| | | | 174/120 AR |
| 2011/0011617 A1 | 1/2011 | Walid | |
| 2011/0240312 A1* | 10/2011 | Varkey | E21B 43/128 |
| | | | 166/377 |
| 2013/0153260 A1 | 6/2013 | Favereau et al. | |
| 2013/0306348 A1* | 11/2013 | Holzmueller | H01B 9/02 |
| | | | 174/105 R |
| 2014/0027152 A1* | 1/2014 | Holzmueller | H01B 3/445 |
| | | | 174/113 R |
| 2014/0158379 A1 | 6/2014 | Cox | |

OTHER PUBLICATIONS

International Search Report and Written Opinion for related PCT Application No. PCT/US2015/061741, dated Mar. 4, 2016, 10 pages.

* cited by examiner

POWER CABLE FOR CABLE DEPLOYED ELECTRIC SUBMERSIBLE PUMPING SYSTEM

CROSS-REFERENCE TO RELATED APPLICATION

The present document is based on and claims priority to U.S. Provisional Application Ser. No. 62/086,565 filed Dec. 2, 2014, which is incorporated herein by reference in its entirety.

BACKGROUND

In many hydrocarbon well applications, electric submersible pumping (ESP) systems are used for pumping of fluids, e.g. hydrocarbon-based fluids. For example, the ESP system may be used to pump oil from a downhole wellbore location to a surface collection location. Some ESP systems are deployed downhole into the wellbore by cable. However, cables used for deploying ESP systems tend to have poor resistance to well fluids and are susceptible to rapid gas decompression events.

SUMMARY

In general, a system and methodology enable construction of a power cable which may be used to deploy an electric submersible pumping system downhole into a wellbore. The power cable is constructed to provide structural support of the electric submersible pumping system while also providing electric power to the electric submersible pumping system when located downhole in the wellbore. The power cable comprises at least one conductor and a plurality of layers selected and arranged to ensure long-term support and delivery of electrical power in the relatively harsh downhole environment. The selection and arrangement of cable layers provide great resistance to incursion of well fluids and protection against rapid gas decompression events.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
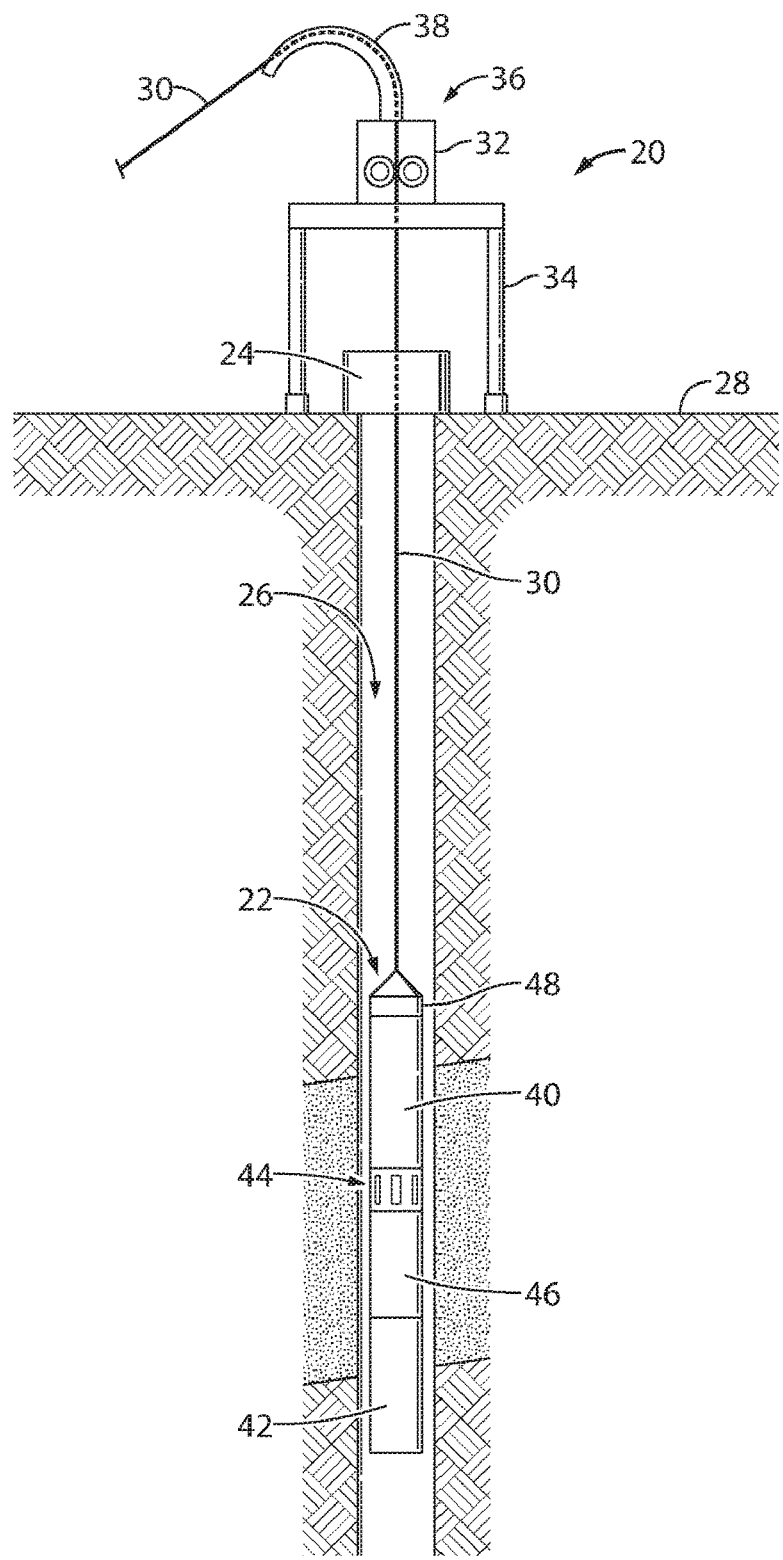
FIG. 1 is a schematic illustration of a well system comprising an example of a cable deployed electric submersible pumping system positioned in a wellbore, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a system and methodology comprising an electrical cable, e.g. power cable, which may be used to deploy a pumping system, e.g. an electric submersible pumping system, downhole into a wellbore. The power cable is constructed to provide structural support of the electric submersible pumping system while also providing electric power to the electric submersible pumping system when located downhole in the wellbore. The power cable comprises at least one conductor and a plurality of layers selected and arranged to ensure long-term support and delivery of electrical power in the relatively harsh downhole environment. The selection and arrangement of cable layers provide great resistance to incursion of well fluids and also protection against rapid gas decompression events.

In various applications, the cable may comprise a plurality of conductors used to provide electric power in downhole pumping applications. For example, the electrical cable may comprise three electrical conductors used to provide three-phase power to a submersible motor of the electric submersible pumping system suspended downhole to pump well fluids. In a specific embodiment, the cable is constructed for a cable deployed electric submersible pumping (CD-ESP) system to improve reliability and resistance to certain events and elements, e.g. rapid gas decompression, well gases, well fluids, and physical damage.

In various applications, the use of CD-ESP systems enables deployment of the pumping system without a rig. By supporting the pumping system on electrical cable and by using an injector head to directly inject the electrical cable, the pumping system deployment may be accomplished without incurring the time and expense associated with use of the rig. Thus, when a downhole pumping system fails, the time spent waiting for the rig, as well as the rig set up and rig teardown time, can be avoided. Use of a coiled tubing injector head or other suitable injector head without a rig increases operational efficiency. By deploying the cable directly through the injector head and without coiled tubing, substantial weight and space savings also are realized, and those savings are of considerable value in offshore deployments and in a variety of other operations.

In an embodiment, the system and methodology may be used to provide a rapid, simple, and cost effective method for deploying an electric submersible pumping system to a desired downhole location. The electric submersible pumping system is coupled to an electrical cable, e.g. power cable, and the cable is routed through an injector head or other suitable equipment. The electric submersible pumping system is supported on the electrical cable and conveyed downhole to the desired position in a wellbore via, for example, the injection head. In a specific example, the system and methodology enable deployment of the electrical cable directly through a coiled tubing type injector head without coiled tubing and without a rig.

Referring generally to FIG. 1, an example of a system 20 for deploying a pumping system 22 is illustrated. In this example, the pumping system 22 is deployed beneath a wellhead 24 and moved downhole to a desired location in a wellbore 26. The wellhead 24 is positioned at a surface location 28 which may be a land surface or a subsea surface. The pumping system 22 is deployed downhole on an electrical cable 30, e.g. a power cable, and the cable 30 may be conveyed downhole via an injection head 32, such as a coiled tubing injection head, or other suitable equipment positioned over the wellhead 24. The cable 30 is structured to support the weight of the pumping system 22 during deployment into the wellbore 26.

By way of example, the injection head 32 may be located over wellhead 24 by an adjustable system 34, e.g. a jack stand, a crane, or another suitable system, which is adjustable in height. In a specific example, the injection head 32 comprises a coiled tubing injection head which is part of an overall coiled tubing injection head system 36 having a guide arch or goose neck 38. The guide arch 38 is coupled with the injection head 32 so as to help guide electrical cable 30 into and through the injection head 32 when the electrical cable 30 is used to convey pumping system 22 downhole into wellbore 26. In some applications, the injection head 32 may be mounted above and separate from the stand 34.

In a variety of applications, the pumping system 22 is in the form of an electric submersible pumping system which may have many types of electric submersible pumping system components. Examples of electric submersible pumping system components include a submersible pump 40 powered by a submersible motor 42. The electric submersible pumping system components also may comprise a pump intake 44, a motor protector 46, and a system coupling 48 by which the electric submersible pumping system 22 is coupled with electrical cable 30. In many applications, the submersible motor 42 may be in the form of a submersible, centrifugal motor powered via electricity supplied by cable 30. The submersible motor 42 may be operated to pump injection fluids and/or production fluids. In some applications, the pumping system 22 may comprise an inverted electric submersible pumping system in which the pumping system components are arranged with the submersible pump 40 below the submersible motor 42. However, pumping system 22 may comprise a variety of pumping systems and pumping system components.

In an operational example, the pumping system 22, e.g. electric submersible pumping system, is coupled to electrical cable 30. The electrical cable 30 is routed through the coiled tubing injector head 32 and wellhead 24. The electrical cable 30 is able to support the weight of pumping system 22 and is thus able to convey the pumping system 22 to a desired position in wellbore 26 without the aid of coiled tubing or a rig. In this application, the cable 30 structurally supports the pumping system 22 while also supplying electrical power to the pumping system 22.

Figure 2:
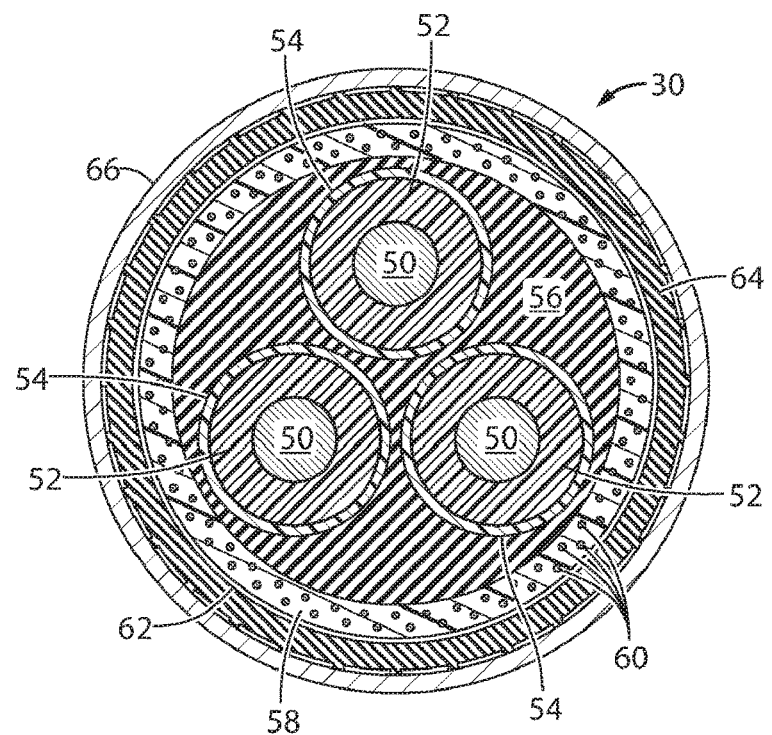
FIG. 2 is a cross-sectional view of an example of the cable illustrated in FIG. 1, according to an embodiment of the disclosure.

Referring generally to FIG. 2, an embodiment of cable 30, e.g. a CD-ESP cable, is illustrated. Working from the inside out in the example illustrated, the electrical cable 30 comprises at least one conductor 50, e.g. three conductors 50 for three phase power. Each conductor 50 may be coated or otherwise covered with an insulation layer 52. Each insulation layer 52 may be coated or otherwise covered with a fluid barrier layer 54.

In a specific embodiment, the cable 30 comprises three conductors 50 which are each coated/covered with the layers 52, 54 and then combined, e.g., laid adjacent to one another, twisted together, or braided with one another, in a jacket 56, e.g. an elastomer jacket. An additional jacket 58 may be positioned to surround the elastomer jacket 56. In at least some embodiments, a next layer surrounding the jacket 58 may be a wire armor layer 60, e.g. a dual wire armor layer. An adhesive 62 may be used in at least some applications to help secure an outer jacket 64, e.g. an elastomer jacket, to wire armor layer 60. Additionally, and armor layer 66 may be positioned around the outer jacket 64. The armor layer 66 may be formed of a suitably strong material, e.g. a steel strip armor wrap for ease of handling and to protect internal components 50, 52, 54, 56, 58, 60, 62 and 64. The armor layer 66 combined with this selection and arrangement of cable layers provide great resistance to incursion of well fluids and also protection against rapid gas decompression events.

By way of example, each conductor 50 may be formed from a suitable, electrically conductive material, such as copper. As an example, cable conductors 50 may be formed from high purity copper and may be solid, stranded or compacted stranded. Stranded and compacted stranded conductors offer improved flexibility, which may be useful in some embodiments. Each conductor 50 also may be coated with a corrosion resistant coating to prevent conductor degradation from, for example, hydrogen sulfide gas which is commonly present in downhole environments. Examples of such a coating include tin, lead, nickel, silver, or other corrosion resistant materials including other alloys or metals.

By way of example, insulation 52 may be formed from a polymeric material, e.g. polyetheretherketone (PEEK). Polymeric insulated conductors, e.g. PEEK insulated conductors, offer good temperature resistance and reliability. As an example, PEEK offers improved mechanical properties which provide improved damage resistance during cable installation and cable operation, including resistance to rapid gas decompression ("RGD"). The high stiffness of PEEK also may allow for the cable to be formed into a tight helix during the manufacturing process without deforming the insulation wall. In addition, the much higher stiffness of PEEK also may allow for much greater ease in sealing over the cable members at cable termination points (e.g. motor pothead, well connectors, feed-throughs). The improved sealing enhances reliability not just of the cable but for the overall system. The fluid resistance properties of PEEK also may allow the cable to continue to function even if well fluid is able to migrate through the jacket 56 and barrier layers 54. In some lower tier or low cost applications where fluid and gas damage is not a concern, ethylene propylene diene monomer (EPDM) insulated conductors may be used. As an example, a low-swell EPDM or oil-resistant EPDM material may be used as insulation layers 52.

In the illustrated example, the fluid barrier layer 54 may serve to protect the insulation layer 52 from corrosive downhole gases and fluids. In some embodiments, additional barrier layers may be disposed over the insulation. In the embodiment illustrated in FIG. 2, the internal fluid barrier 54 may be formed of extruded or taped layers of fluoropolymers. In some embodiments, the fluid barrier layer 54 may be a 0.002 inch thick polytetrafluoroethylene (PTFE) film wrapped with a 50-55% overlap; however, other thicknesses and overlap percentages may be selected for certain applications. Examples of such thicknesses include thicknesses from about 0.00001 inch to about less than 0.002 inch although some applications may utilize layer thicknesses from about 0.002 inch to about 0.01 inch or even greater. The fluid barrier 54 also may be formed from other materials, e.g. polymeric materials, and wrapped with other overlap percentages, e.g., 20%, 25%, 30%, 45%, 65%, or other suitable percentages depending on the parameters of a given application.

The barrier layer 54 also may serve as a process aid by preventing damage to the insulation 52 during, for example, a conductor twisting and jacket extrusion process. In some embodiments, a polyester braid or tape or a foamed layer also may be added over the barrier layer 54 to improve damage resistance.

By way of further example, the internal cable jacket 56 may comprise an EPDM elastomer or other suitable material. EPDM exhibits excellent resistance to downhole gases and fluids and possesses adequate dielectric properties. The jacket layer may provide mechanical stabilization of the conductors 50 as well as some degree of protection from fluids and gases. In some embodiments where additional fluid and gas resistance is sought, a hydrogenated nitrile butadiene rubber ("HNBR") elastomer jacket 56 may be used. In high amperage cable embodiments, the jacket 56 may incorporate thermally conductive fillers to improve heat dissipation in the cable 30.

In a variety of applications, jacket layer 58 may comprise a fluoropolymer, such as ethylene tetrafluoroethylene copolymer (ETFE), and may be formed by extrusion. Commercially available ETFE copolymers include TEFZEL™ ETFE resin available from DuPont. Jacket layer 58 may serve as a fluid barrier layer and also can be used as a bedding layer for wire armor 60. Jacket layer 58 also may incorporate fillers, e.g. carbon black, for increased strength or to aid in heat absorption which would allow softening of the jacket 58 to embed the wire armor 60 during an appropriate manufacturing process.

In embodiments utilizing wire armor 60, the wire armor 60 may comprise a dual helical armor wrap to help provide the structural strength for supporting the weight of electric submersible pumping system 22 during deployment and use in wellbore 26. In this example, the wire armor 60 effectively serves as a structural support member of the cable to facilitate deployment of the pumping system 22. In some embodiments, the wire armor 60 may be embedded in the previously discussed jacket layer 58 to stabilize it and to prevent voids where gas could otherwise build up. In some embodiments, the armor wrap may be a galvanized improved plough steel ("GIPS")-style armor wrap (single or dual helical). Additionally, the armor wrap 60 may comprise high strength alloys or coated steel wires with sufficient load bearing strength.

Furthermore, various types of adhesive layers 62 may be used in some embodiments to bond the outer elastomer jacket 64 to the wire armor 60 and/or jacket layer 58. In some embodiments, the adhesive layer 62 may be an extruded elastomer adhesive. The adhesive layer 62 also may comprise a solvent-based or water-based adhesive. As an example, the adhesive may be selected with a sufficiently low viscosity or may be applied with sufficient pressure so as to prevent formation of voids or spaces around the outer wires of wire armor 60 where gas could otherwise accumulate.

In the illustrated example, external jacket layer 64 may be formed from an elastomer material. Additionally, the external jacket layer 64 may be co-extruded with the adhesive system 62 which bonds it to the wire armor 60. As an example, external jacket 64 may serve to protect the helical wire wrap of wire armor 60 from corrosive fluids while also providing a substrate for wrapping the armor 66. In some embodiments, longitudinal splines are added to, or formed in, the jacket layer 64 to facilitate the bite (or "grip") of the armor 66 with respect to jacket layer 64. Depending on the application, the jacket layer 64 may comprise EPDM or HNBR. In some embodiments the jacket layer 64 may comprise an additional fluoroplastic or PEEK layer on the exterior of the jacket layer 64 to improve fluid resistance.

Armor layer 66 may be the outermost layer, i.e. most external layer. In the embodiment illustrated, armor layer 66 is used to constrain the inner components 50, 52, 54, 56, 58, 60, 62, 64; to provide abrasion resistance; and to prevent damage due to crushing of the cable 30. By radially constraining the elastomer jacket 64 and the layers within jacket 64 via armor layer 66, the elastomer jacket 64 provides the cable 30 with substantially improved resistance to gas absorption. This improved resistance to creation of gas pockets reduces or prevents damage that could otherwise occur during rapid gas decompression events.

Armor wrap layer 66 may be constructed from a suitable material, such as galvanized steel, stainless steel, or Monel™ strip. In some embodiments, the armor wrap 66 may be formed from a metallic strip of 0.5 inch to 0.75 inch width material and the strips of armor wrap 66 may be wrapped with a 40-50% overlap. The armor wrap 66 may be applied in various configurations including, but not limited to, a flat profile, an S-profile, and an interlocked profile. In some embodiments, an additional armor wrap layer or layers may be disposed atop a first armor wrap layer. With multiple armor wrap layers, the internal layer may have a first profile (e.g., a flat profile) while the outer layer may have a different profile (e.g., an S-profile or interlocked profile).

Figure 3:
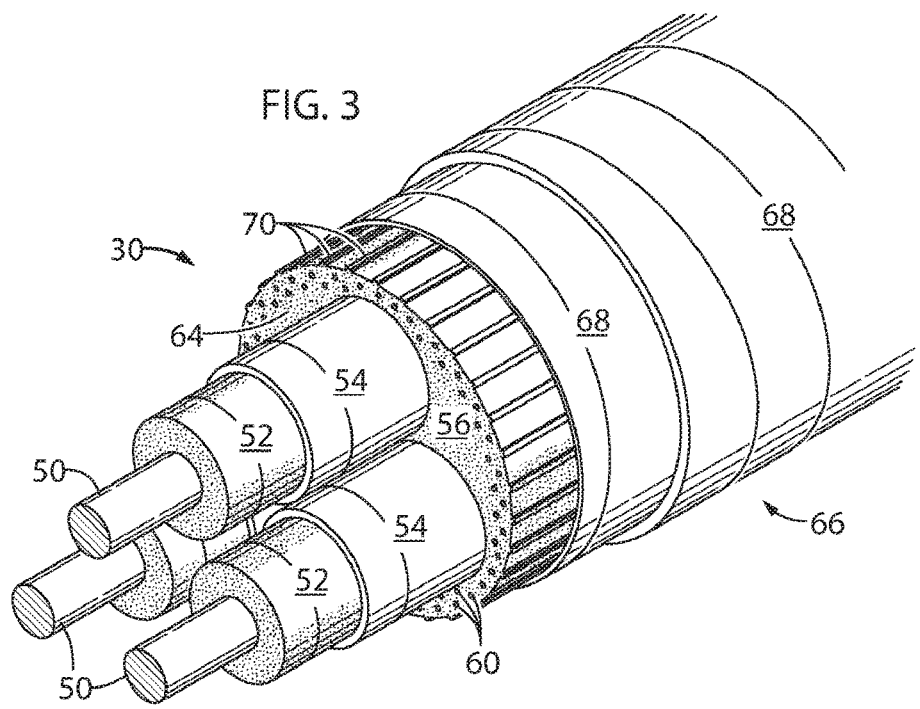
FIG. 3 is an orthogonal view of another example of a cable that may be used to deploy the electric submersible pumping system illustrated in FIG. 1, according to an embodiment of the disclosure.

Referring generally to FIG. 3, an embodiment is illustrated in which a CD-ESP cable 30 comprises armor wrap 66 in a form having multiple armor wrap layers 68 disposed over elastomer jacket 64. In the embodiment shown in FIG. 3, jacket 64 may be formed from an EPDM material. Additionally, the elastomer jacket 64 may be constructed with a plurality of splines 70 axially disposed on its outer surface. The radially inward armor wrap layer 68 may be applied directly over jacket 64 in a flat profile. In this example, the radially outer armor wrap layer 68 may be applied atop the adjacent, radially inward armor wrap layer 68. Furthermore, the fluid barrier layer 54 may comprise a plurality of layers. Similarly, the insulation layer 52 may comprise several combinations of insulating layers used in cooperation.

Depending on the application, the electrical cable 30 may have a variety of shapes and/or components. For example, the electrical cable 30 may have a variety of layers formed of various materials in various orders within the armor layer. Additionally, various layers may be disposed around the corresponding conductors individually or collectively. The number, type, and arrangement of electrical conductors also may be selected according to the parameters of a given application and environment. For example, the electrical cable may have a round configuration, a rectangular configuration, or a flat configuration to accommodate certain spatial constraints. Various additives and materials may be mixed with or otherwise added to materials forming the various layers of the electrical cable 30. The electrical cable 30 may be in the form of a power cable which provides electrical power to downhole systems, e.g. electric submersible pumping system 22, however the electrical cable may be used in a variety of other types of applications.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for conducting electricity in a wellbore, comprising:

an electric submersible pumping system;

a power cable coupled to the electric submersible pumping system and supporting the weight of the electric submersible pumping system during deployment into the wellbore, the power cable comprising:
- a plurality of conductors;
- a plurality of insulation layers, wherein each insulation layer of the plurality of insulation layers is in contact with a respective conductor of the plurality of conductors;
- a plurality of fluid barrier layers, wherein each fluid barrier layer of the plurality of fluid barrier layers is in contact with a respective insulation layer of the plurality of insulation layers;
- a first jacket layer surrounding each fluid barrier layer of the plurality of fluid barrier layers;
- a wire armor layer disposed along an outer surface of the first jacket layer;
- a second jacket layer covering the wire armor layer; and
- an armor layer in contact with the second jacket layer.

2. The system as recited in claim 1, further comprising a fluoropolymer-based layer disposed between the first jacket layer and the wire armor layer.

3. The system as recited in claim 1, further comprising an adhesive disposed between the wire armor layer and the second jacket layer.

4. The system as recited in claim 1, wherein the plurality of conductors comprise copper.

5. The system as recited in claim 1, wherein the plurality of insulation layers comprise PEEK.

6. The system as recited in claim 1, wherein the plurality of fluid barrier layers comprise PTFE.

7. The system as recited in claim 1, wherein the first jacket layer comprises EPDM.

8. The system as recited in claim 1, wherein the first jacket layer comprises HNBR.

9. The system as recited in claim 1, wherein the wire armor layer comprises a dual helical armor wrap.

10. The system as recited in claim 1, wherein the second jacket layer comprises an elastomer.

11. The system as recited in claim 1, wherein the armor layer comprises galvanized steel.

12. The system as recited in claim 1, wherein the armor layer comprises a plurality of armor layers.

13. A system for supplying electricity, comprising:
an electric cable comprising:
- a plurality of conductors for conducting electricity, each conductor being surrounded by a respective insulation layer of a plurality of insulation layers, and each insulation layer surrounded by a respective fluid barrier layer of a plurality of fluid barrier layers;
- a jacket layer surrounding each fluid barrier layer of the plurality of fluid barrier layers, each insulation layer of the plurality of insulation layers, and each conductor of the plurality of conductors;
- a wire armor layer disposed along an outer surface of the jacket layer, the wire armor layer being arranged to establish a support member capable of supporting the weight of an electric submersible pumping system;
- a second jacket layer covering the wire armor layer; and
- an armor layer in contact with the second jacket layer.

14. The system as recited in claim 13, wherein the plurality of conductors comprises three conductors for carrying three-phase power.

15. The system as recited in claim 14, wherein the plurality of insulation layers comprise PEEK.

16. The system as recited in claim 15, wherein the plurality of fluid barrier layers comprise PTFE.

17. The system as recited in claim 16, wherein the wire armor layer comprises a dual metal wire layer.

18. The system as recited in claim 13, wherein the electric cable comprises an adhesive disposed between the wire armor layer and the second jacket layer.

19. A method for ensuring a dependable supply of electricity in a wellbore, comprising:
- placing each insulation layer of a plurality of insulation layers in contact with a respective conductor of a plurality of conductors for conducting electricity;
- covering each insulation layer of the plurality of insulation layers with a respective fluid barrier layer of a plurality of fluid barrier layers;
- providing a jacket of elastomeric material to collectively surround each fluid barrier layer of the plurality of fluid barrier layers;
- disposing a wire armor support layer along an outer surface of the jacket;
- positioning a second jacket over the wire armor support layer; and
- locating an armor layer around the second jacket and in contact with the second jacket to form an electrical cable.

20. The method as recited in claim 19, further comprising supporting an electric submersible pumping system with the electrical cable during deployment of the electric submersible pumping system downhole into a wellbore.

* * * * *